(12) United States Patent
Schneider et al.

(10) Patent No.: US 12,534,887 B2
(45) Date of Patent: Jan. 27, 2026

(54) HIGH PRESSURE WATER SUPPLY SYSTEM AND AIRCRAFT EQUIPPED WITH SUCH SYSTEM

(71) Applicant: Airbus Operations GmbH, Hamburg (DE)

(72) Inventors: Frank Schneider, Hamburg (DE); Hannes Müller, Hamburg (DE); Axel Schreiner, Hamburg (DE); Frederik Albers, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/749,706

(22) Filed: Jun. 21, 2024

(65) Prior Publication Data
US 2024/0426086 A1 Dec. 26, 2024

(30) Foreign Application Priority Data
Jun. 22, 2023 (EP) .................................. 23181043

(51) Int. Cl.
    *E03B 7/07* (2006.01)
    *E03B 5/00* (2006.01)
    *B64D 11/02* (2006.01)

(52) U.S. Cl.
    CPC ............... *E03B 7/075* (2013.01); *E03B 5/00* (2013.01); *B64D 11/02* (2013.01)

(58) Field of Classification Search
CPC ......... E03B 7/075; B64D 11/02; B64D 11/04; B60R 15/00; B60R 15/02; B60R 15/04
See application file for complete search history.

(56) References Cited

U.S. PATENT DOCUMENTS

| | | | |
|---|---|---|---|
| 10,815,007 B2* | 10/2020 | Bis | E03B 1/00 |
| 2004/0186634 A1* | 9/2004 | Lucky | G05D 9/12 |
| | | | 701/3 |
| 2018/0238765 A1 | 8/2018 | Gramespacher | |
| 2018/0291595 A1 | 10/2018 | Lubbert | |
| 2021/0223799 A1* | 7/2021 | Osborne | B64F 5/40 |
| 2022/0342431 A1 | 10/2022 | Schreiner | |
| 2022/0404228 A1 | 12/2022 | McIntosh | |
| 2023/0135331 A1* | 5/2023 | Kessler | B64D 11/02 |
| | | | 137/561 R |

OTHER PUBLICATIONS

Extended European Search Report issued in Application No. 23181043.3, dated Dec. 19, 2023, 7 pages.

\* cited by examiner

*Primary Examiner* — Reinaldo Sanchez-Medina
(74) *Attorney, Agent, or Firm* — KDW Firm PLLC (57) ABSTRACT

A high pressure water supply system for an aircraft includes a main water supply tank, water consumers, pressurization units configured to convey water from the main water supply tank to the water consumers, and a controller. One pressurization unit of the pressurization units conveys water to a first subset of water consumers of the water consumers via a corresponding high pressure water supply line, and the controller is configured to control an output pressure of the one pressurization unit depending on a hydraulic resistance length of the high pressure water supply line.

15 Claims, 9 Drawing Sheets

HIGH PRESSURE WATER SUPPLY SYSTEM AND AIRCRAFT EQUIPPED WITH SUCH SYSTEM

TECHNICAL FIELD

The present disclosure generally relates to a high pressure water supply system for an aircraft and an aircraft having such water supply system. Particularly, the present disclosure relates to a water supply system comprising a plurality of pressurization units, each conveying water to one more of a plurality of water consumers, wherein an output pressure of the pressurization units is controlled based on a hydraulic resistance of a high pressure water supply line between the respective pressurization unit and the water consumer. Furthermore, the present disclosure relates to an aircraft comprising such water supply system.

BACKGROUND

A conventional water supply system for aircrafts includes a central water tank and a water conveying device supplying water to all water consumers in the aircraft. Such water consumers include lavatory monuments (e.g. having a faucet and a toilet) and galleys (e.g. having a faucet, a hot water dispenser, food preparation devices, etc.).

The water conveying device is designed to provide a sufficient amount of water to all water consumers (sufficient water flow rate), and to provide the necessary overall water pressure for the entire system. As a mere example, a rinsing nozzle for a toilet usually requires a higher water pressure than a faucet. Moreover, a monument further away from the central water conveying device requires a higher water pressure due to the pressure loss in the water supply duct. The central water conveying device, hence, is designed for a maximum water pressure depending on the highest pressure demand, and pressure reducers are installed at water consumers that do not require the maximum water pressure.

Thus, the water supply system for an aircraft is usually overdesigned and, hence, requires extensive energy and involves high costs.

SUMMARY

It is therefore an object of the present disclosure to provide a simplified water supply system.

This object is solved by the disclosure and preferred embodiments herein.

According to a first aspect to better understand the present disclosure, a high pressure water supply system for an aircraft comprises a main water supply tank, a plurality of water consumers, a plurality of pressurization units configured to convey water from the main water supply tank to the plurality of water consumers, and a controller.

The water supply system, particularly, includes one pressurization unit of the plurality of pressurization units that conveys water to a first subset of water consumers of the plurality of water consumers via a corresponding high pressure water supply line. The controller is configured to control an output pressure of the one pressurization unit depending on a hydraulic resistance of the high pressure water supply line. The hydraulic resistance is based on a length, inner diameter, inner surface roughness, and number and types of bends of the high pressure water supply line, as well as a difference in height between pressurization unit and water consumers and flow rate currently used.

This provides for a simplified water supply system. Particularly, since the output pressure depends on a hydraulic resistance of the high-pressure water supply line (e.g., only a length of the water supply line or one or more further parameters characterising the water supply line), the entire water supply system does not need to be "overdesigned". In addition, pressure reducers can be omitted, for example, if the first subset of water consumers is connected to the one pressurization unit via a water supply line of substantially same hydraulic resistance and/or if the first subset of water consumers requires a similar water pressure. A "substantially same hydraulic resistance" of the water supply lines in this disclosure means a hydraulic resistance difference of two water supply lines of +/−5%, +/−10% or +/−20%. As a mere example, assuming the distance between the one pressurization unit and a water consumer of the first subset is about 20 m and requiring several bends in the water supply line, which has an inner diameter of 4 mm, another water consumer of the same first subset having a water supply line length of 18 m to 22 m, or 16 m to 24 m with similar number of bends and of same in a diameter, would still fall under "substantially same hydraulic resistance".

Since more than one water consumer may have a water supply demand (i.e. the water consumers are activated) at the same time, the controller can be configured to control the pressurization unit in accordance with the hydraulic resistance specific for one of these activated water consumers. This may require that other water consumers, such as sensible water consumers or water consumers requiring a rather low-pressure, can be equipped with a throttling device or pressure reducer. Likewise, water consumers connected to a rather short supply line or of rather low hydraulic resistance may also be equipped with a throttling device or pressure reducer, also referred to as an (adjustable) restrictor as a mere example, a proportional valve could be employed and/or other active restrictors, so that a dynamic adjustment of the water pressure at each individual water consumer can be provided. This allows a hydraulic balancing of all water consumers, while achieving an optimized pressurization unit operation.

A pressurization unit of the plurality of pressurization units can be a pump, a positive displacement pump (such as a gear pump, membrane pump, piston pump, impeller pump), a centrifugal pump (such as an impeller pump or a site channel pump), a compressor, a micro-pump, or any other fluid conveying device.

In an implementation variant, each of the plurality of water consumers can be supplied with high pressure water from a respective one of the plurality of pressurization units via a respective high pressure water supply line. In other words, the number of pressurization units is equal to the number of water consumers. This allows installing small pressurization units, such as micro-pumps, since only a small amount of water has to be conveyed at a predefined pressure. In addition, any variable control of a flow rate or pressure of the pressurization unit can be omitted, since such parameters can be preset.

Alternatively, the first subset of water consumers can comprise two or more water consumers of the plurality of water consumers. For instance, the two or more water consumers may form a group of water consumers that are similar or have a particular characteristic in common, such as water consumers in the same monument, and/or water consumers in different monuments in a region of the aircraft requiring a water supply line of substantially same hydraulic resistance, and/or the same type of water consumers in a region of the aircraft requiring a water supply line of substantially same hydraulic resistance. As a mere example, the same type of water consumers in the first subset can be all faucets that are spatially close to one another, such as faucets of adjacent lavatories and/or galleys. This allows providing a pressurization unit for the particular first subset of water consumers that can be operated in the same manner for each of the water consumers, which simplifies control of the pressurization unit or allows omitting any control, but preset parameters of the pressurization unit. For instance, if one pressurization unit supplies water to a small number of faucets or other water consumers of same type, the pressurization unit can be operated with the same parameters or characteristics independent of which water consumer is currently running.

It is to be understood that in case of multiple water consumers of the same subset or group running at the same time, the controller is further configured to control an output pressure of the pressurization unit associated with this subset or group depending on the number of concurrently running water consumers. Nevertheless, a main factor for the required output pressure is the hydraulic resistance of the associated water supply line running from the pressurization unit to the subset or group of water consumers.

In another implementation variant, the water supply system can further comprise a second subset of water consumers of the plurality of water consumers, the second subset comprising one or more water consumers. In other words, the plurality of water consumers is divided into a first and second subset. It is to be understood that the number of subsets is not restricted to two, but that the present disclosure covers any number of subsets. Each subset can be supplied with water from a respective pressurization unit of the plurality of pressurization units.

In a further implementation variant, the controller can be further configured to control an output pressure of each of the plurality of pressurization units depending on a hydraulic resistance of the respective high pressure water supply line. Thus, the water supply system is simplified by allowing installation of a plurality of pressurization units, each being operated with preset parameters or conditions, depending on the water consumers associated with the respective pressurization unit.

In yet a further implementation variant, the controller can be further configured to control the output pressure of one or more of the plurality of pressurization units depending on a type of water consumer that is currently activated, i.e. that needs a water supply, a number of water consumers being currently activated, i.e. that need a water supply simultaneously, or other characteristics of the water consumers.

In another implementation variant, another pressurization unit of the plurality of pressurization units can convey water to the first subset of water consumers via the corresponding high pressure water supply line. Thus, the other pressurization unit can be employed to increase a flow rate and/or output pressure in the high-pressure water supply line to the first subset of water consumers.

For instance, the other pressurization unit can be fluidly connected to the one pressurization unit in parallel or in series. This allows an increase of flow rate and pressure, respectively.

It is to be understood that more than two pressurization units can be connected to one another in parallel and/or in series or combinations thereof, in order to achieve a desired flow rate and/or output pressure.

Furthermore, the controller can be further configured to control the one pressurization unit and the other pressurization unit depending on a required flow rate of water at the first subset of water consumers. Alternatively or additionally, the controller can be further configured to control the one pressurization unit depending on a required water pressure at the first subset of water consumers. For instance, if two water consumers request water at the same time, the flow rate may be increased. Likewise, if a water consumer that requires a higher pressure than other water consumers (of the same subset) requests a water demand, a higher pressure of the water supply can be provided via the multiple pressurization units. As a mere example, in a lavatory monument, a rinsing nozzle of a toilet requires a higher pressure than a faucet installed in the same monument. This higher pressure can be achieved by controlling the other pressurization unit to operate only in case the rinsing nozzle is activated.

In an implementation variant, the water supply system can further comprise a pressure sensor in the high pressure water supply line. The controller can then be further configured to maintain the output pressure of the one pressurization unit at a predefined pressure level. This allows pressurizing the high pressure water supply line at the predefined pressure level, so that any time water is required at an associated water consumer the water has the predefined pressure level. This allows omission of any control devices at the water consumers, which control devices would otherwise send information to the controller. Thus, all control components can be located at the pressurization unit, which simplifies the overall system.

In another implementation variant, the water supply system can further comprise a pressure equalizing reservoir fluidly connected to the high pressure water supply line and configured to mechanically maintain the predefined pressure level in the high pressure water supply line. As a mere example, the reservoir can be any compressible or elastic element, including an elastic hose section, or any container, in which a water pressure can be built up and can be released into the high pressure water supply line, for example, until the pressurization unit begins operating or increases its output pressure. The mechanically maintaining of the predefined pressure level can be achieved by an elastic or biased element, such as a membrane or a spring-loaded piston.

In yet another implementation variant, at least one of the plurality of water consumers can comprise a micro storage device fluidly connected to the high pressure water supply line, configured to store an amount of water required for flushing a toilet and to achieve a water pressure sufficient for a nozzle rinsing/flushing the toilet. For instance, the micro storage device can include a mechanical water conveyor, such as an elastic element, for example, a spring-loaded piston, a membrane or other biased element. Thus, water from the high pressure water supply line may be filled into the micro storage device, e.g., an amount sufficient for flushing the toilet. When the toilet flushing is activated, the mechanical water conveyor presses the water to the nozzle for rinsing/flushing the toilet. At this time, a fluid connection to the high pressure water supply line may be open or closed, so that the flushing of the toilet is achieved under support of the water supply from the high-pressure water supply line or solely by the mechanical water conveyor. Such micro storage device allows operating the pressurization unit associated with the toilet with a particular flow rate that may not be high enough for operating the nozzle for rinsing the toilet, but is preset in view of a flow rate required for a faucet also associated with the pressurization unit. In other words, the pressurization unit is preset in view of the faucet (e.g., requiring a larger amount of water at a lower pressure), while the micro storage device achieves flushing the toilet in a fast manner, but requiring a small amount of water at a higher pressure (compared to the faucet).

In a further implementation variant, at least one of the plurality of water consumers can comprise an unpressurized water buffer tank and a water conveying device configured to convey water from the unpressurized water buffer tank to a faucet. As a mere example, the unpressurized water buffer tank and water conveying device may be associated with a faucet or similar water fountain device. The unpressurized water buffer tank is fluidly connected to the high pressure water supply line, for example, via a shutoff valve, and is vented to the ambient, so that no or only a small pressure inside the unpressurized water buffer tank can build up. For instance, a venting line or overflow line can be connected to the unpressurized water buffer tank for venting the tank to the ambient. Such venting or overflow line can have a larger diameter than the high pressure supply line, in order to avoid an unwanted pressure build-up in the buffer. A duct or pipe between the unpressurized water buffer tank, conveying device and water consumer can have a different diameter (particularly larger) as the high-pressure water supply duct. Thus, the one pressurization unit can be operated in accordance with parameters and characteristics for another water consumer requiring a higher pressure, such as a nozzle for rinsing a toilet. Via the unpressurized water buffer tank, the faucet can be decoupled from the high-pressure water supply line (particularly with respect to the provided water pressure) in any operational state fluidly downstream of the shutoff valve for filling the unpressurized water buffer tank.

Furthermore, the controller can further be configured to control the pressurization unit associated with the unpressurized water buffer tank to control and output pressure of the pressurization unit depending on the needs to refill the unpressurized water buffer tank. Likewise, the controller can further be configured to control the pressurization unit depending on whether the unpressurized water buffer tank is to be refilled and a further water consumer needs a water supply at the same time.

In yet a further implementation variant, at least one of the plurality of water consumers can comprise a consumer controller configured to transmit a signal indicating a water usage at the associated consumer, and the controller can be further configured to receive the signal transmitted from the consumer controller and to control the output pressure of the one pressurization unit based on the received signal. This allows operating the one pressurization unit only if the consumer controller indicates a required water supply.

As a mere example, the consumer controller can further specify which type of water consumer requests water, so that the controller can adapt the output pressure of the one pressurization unit not only depending on the hydraulic resistance of the high-pressure water supply line, but also depending on the type of water consumer. For instance, a nozzle for rinsing a toilet requires a higher pressure than a faucet or similar water consumer in a galley.

Alternatively or additionally, the consumer controller can further identify the water consumer requesting water, which further allows the controller to determine the hydraulic resistance of the high-pressure water supply line. As a mere example, the controller can have a look up table or the like were the hydraulic resistance of a plurality of high-pressure water supply lines is stored together with an identification of the high-pressure water supply lines and/or the connected water consumers. The controller can then adapt the output pressure accordingly.

It is to be understood that the consumer controller can additionally or alternatively store the hydraulic resistance of the high-pressure water supply line connecting the associated water consumer and provide the hydraulic resistance information to the controller either alone or together with an identity of the water consumer. Further alternatively or additionally, instead of an identity of the water consumer, a type of water consumer can be indicated by the consumer controller to the controller. Since an aircraft usually comprises a plurality of water consumers of the same type, the controller can determine the required water pressure and/or flow rate in accordance with the hydraulic resistance of the high-pressure water supply line and the type of water consumer.

According to a second aspect to better understand the present disclosure, an aircraft comprises at least one water supply system of the first aspect or one of its variants and/or examples.

Furthermore, the aircraft can comprise one or more monuments including respective water consumers.

In an implementation variant, the aircraft can comprise a network of high-pressure water supply lines connecting the plurality of pressurization units with the one or more monuments (which can include an internal water supply network) and/or with the plurality of water consumers (directly).

The high-pressure water supply lines can be configured to withstand a water pressure up to 20 bar, or even up to 50 bar, which could be provided by the pressurization unit. Such high-pressure allows provision of water supply lines having only a small diameter. As a mere example and irrespective of the aspect and implementation variant, the internal diameter of a high-pressure water supply line can be between 3 mm and 10 mm, preferably between 4 mm and 6 mm. This allows installing a plurality of such water supply lines in the aircraft, since they are space-saving and can be easily guided through installations basis of the aircraft, like electric cables.

It is to be understood that the fluid connection between pressurization unit and a water consumer, particularly a subset of water consumers, can consist of water supply lines having different diameters. As a mere example, in case the subset of water consumers is far away from the pressurization unit, the main portion of the high-pressure water supply line can have an increased inner diameter, such as 6 mm to 8 mm, while the remaining water supply lines, particularly, the branches to the individual water consumers, have an inner diameter of 4 mm to 6 mm.

In another implementation variant, the aircraft can comprise an aircraft data network. The controller of the high-pressure water supply system can be connected to the aircraft data network. For example, this allows receiving by the controller a signal from a water consumer and/or a consumer controller that a water supply is requested. Based on this received signal, the controller can operate the one pressurization unit in accordance with preset parameters or characteristics of the pressurization unit to achieve the requested water supply (in terms of flow rate and/or pressure).

As a mere example, the signal received by the controller can be triggered by a decrease of filling level of a buffer or micro storage device, and/or the activation of a consumer equipment (e.g., triggered by an infrared sensor or an electrical contact etc.).

Furthermore, once several consumers of a same subset or group are requesting water simultaneously, a prioritization of the water consumers can be implemented by the controller, such as based on a buffer/micro storage device filling level, a class information (passenger class, such as first, business or economy class), and/or a type of the water consumer or any other parameter associated with the water consumer that is collected and can be send via the consumer controller or the data network. Different priorities are conceivable to organize the refilling and supply of the different water consumers in case of normal water supply operation and also to grant high priority and low priority in case of very high consumption phases. As a mere example, in certain times of the flight, the lavatories may give in a higher priority, or a galley may be given a higher priority during food preparation phases.

Based on the signal and/or prioritization, the controller can control an output pressure of the pressurization unit(s) associated with the water consumers currently requesting water. As a further example, the controller can be triggered by a general signal, such as a signal initiated by a pilot panel or flight assistant panel. For instance, at the beginning of a flight or start-up of the system, the controller can receive a initiation signal. This may trigger a certain protocol or mode to fill buffer tanks or micro storage devices, depending on their filling level, and/or to flush all toilets once or the like. Here the prioritization of each water consumer may be taken into account by the protocol or mode and, hence, by the controller.

In a further implementation variant, the controller can be further configured to perform special high-pressure protocols. This is particularly possible, as most of the individual water consumers are not equipped with a water restrictor or similar pressure reducer. For example, a high-pressure toilet cleaning, a high flow water faucet (e.g., to fill a drowning device for overheated or burning batteries), and/or a high-pressure fire extinguisher can be operated with a high water pressure supplied by one or more pressurization units and via the corresponding high-pressure water supply line.

In yet a further implementation variant, the controller can be further configured to determine a pump performance, for example, to compensate for biofilm growth or scaling of a valve or the water supply line, et cetera. Such determination may be sensor based, based on a time of operation of the individual devices, and/or based on a manual observation and corresponding adjustment signal provided to the controller. Thus, the output pressure of the pressurization unit can be adjusted or adapted to certain circumstances determined by the controller.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to example implementations illustrated in the figures, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
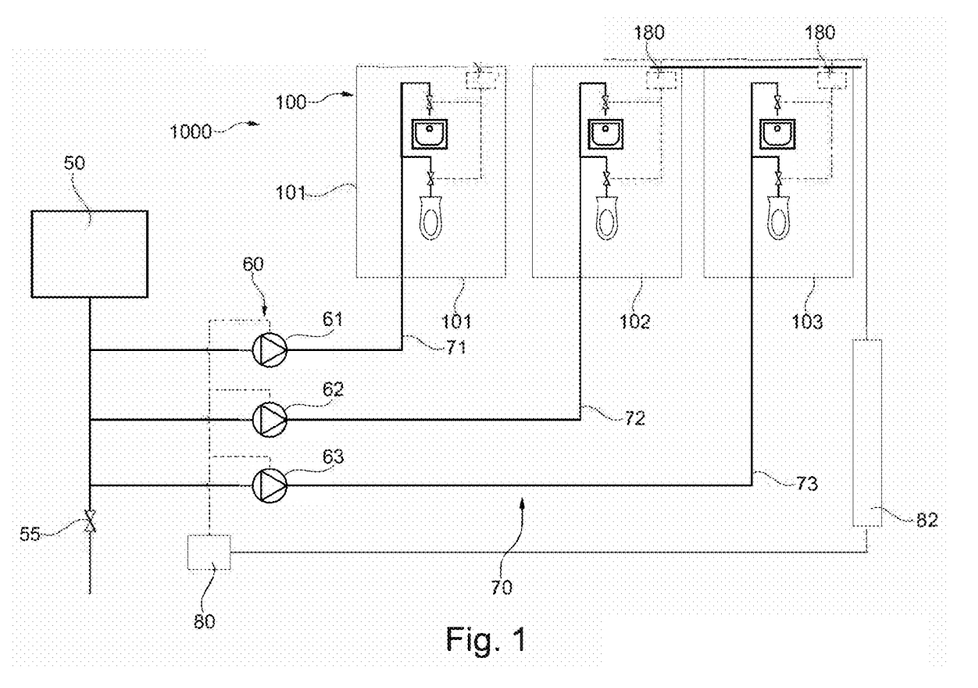
FIG. 1 schematically illustrates an example water supply system.
Figure 9:
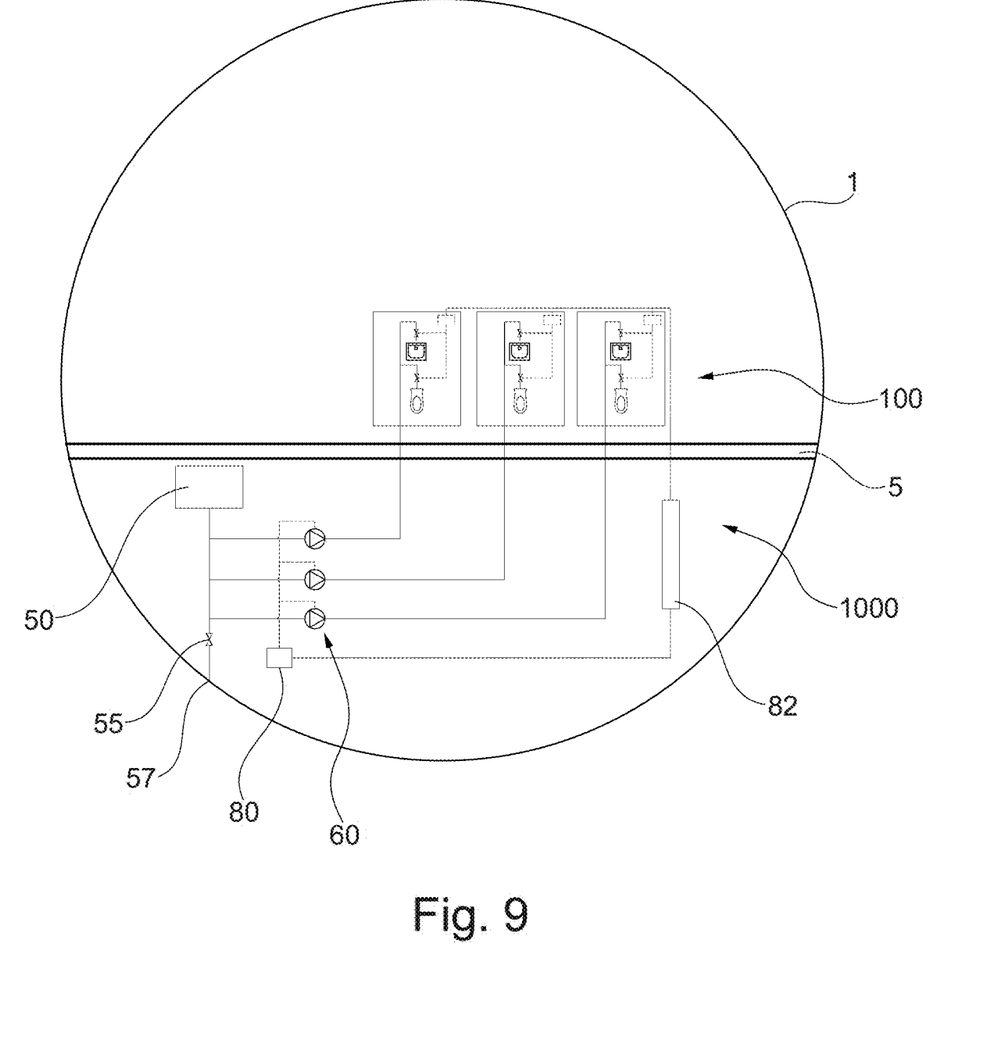
FIG. 9 schematically illustrates an aircraft comprising a water supply system.

FIG. 1 schematically illustrates an example water supply system 1000. Such water supply system 1000 may be installed in an aircraft 1 (FIG. 9). The water supply system 1000 comprises a main water supply tank 50. This tank 50 can be filled with (potable) water and can be installed anywhere in the aircraft 1. As a mere example, the main water supply tank 50 can be installed in a belly at a (longitudinal) centre of the aircraft 1. The tank 50 can be filled, for example at turnarounds of the aircraft 1, via a fill valve 55 (and/or corresponding inlet).

The water supply system 1000 may be configured to supply water from the main water supply tank 50 to a plurality of water consumers 100. FIG. 1 illustrates exemplarily three monuments 101, 102, 103, particularly lavatory monuments, each of which includes two water consumers in form of a faucet and a toilet, the details of which will be explained with respect to FIGS. 7 and 8. It is to be understood that water consumers 100 may likewise be installed alone (e.g., humidifiers or water dispensers) or in other types of monuments, such as a galley (e.g., including a water fountain, food heating device including a steamer, coffeemaker, hot water provider, or the like) or a washroom including a shower.

The water supply system 1000 further comprises a plurality of pressurization units 60. As the example water supply system 1000 of FIG. 1 includes three monuments 100, the example water supply system 1000 includes three pressurization units 61, 62, 63. Each of the pressurization units 61, 62, 63 conveys water to a first subset 101, 102, 103 of water consumers via a respective high-pressure water supply line 71, 72, 73. Although each of the subsets 101, 102, 103 includes two water consumers (faucet and toilet), it is to be understood that each subset 101, 102, 103 may also comprise only one water consumer as well as more than two water consumers. Furthermore, although each subset 101, 102, 103 is illustrated as one monument, it is to be understood that each subset 101, 102, 103 can include more than one monument, a group of monuments, a group of water consumers irrespective of an installation in a monument, such as all faucets of adjacent monuments, or the like.

The high-pressure water supply lines 71, 72, 73 can be installed in the aircraft 1 in any desired manner and can together form a water supply network 70.

Furthermore, the water supply system 1000 comprises a controller 80 that is configured to control an output pressure of each one of the pressurization units 60 depending on a hydraulic resistance of the associated high-pressure water supply line 70. As a mere example, the pressurization unit 61 can be controlled to convey water from the main water supply tank via water supply line 71 to the first subset 101 of water consumers at an output pressure depending on the hydraulic resistance of the water supply line 71. This allows achieving a water flow rate and water pressure at the water consumer(s) of the first subset 101 that is optimized for this first subset 101. Particularly, due to the hydraulic resistance of the water supply line 71, a pressure loss will occur that depends specifically on the hydraulic resistance of the line 71.

Figure 10:
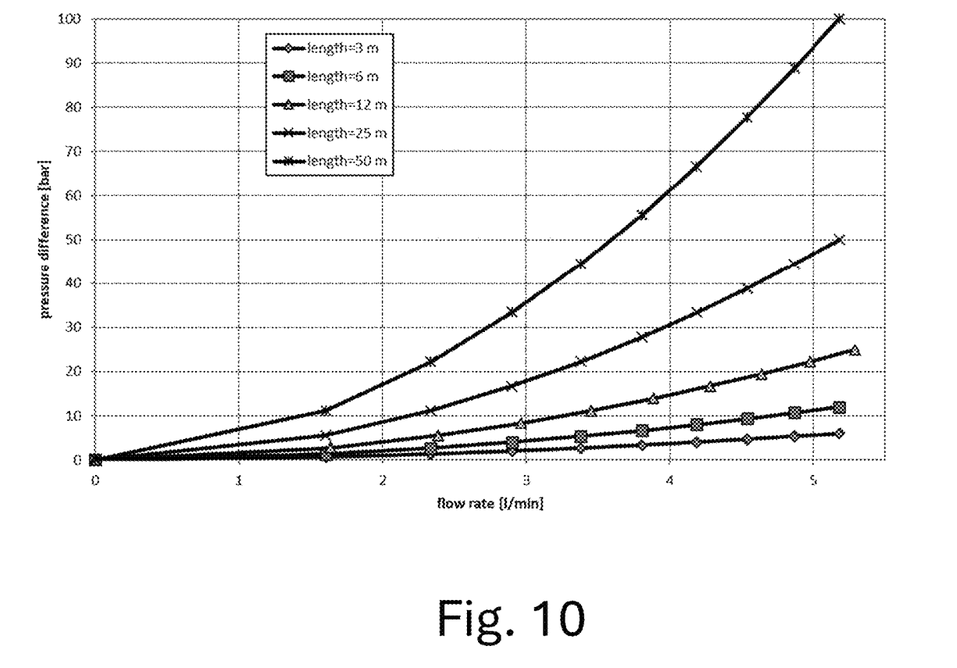
FIG. 10 schematically illustrates an example relationship between flow rate and pressure difference.

FIG. 10 is a diagram illustrating an example relationship between flow rate and pressure difference depending on the lengths of the water supply line 71 (the length of the water supply line 71 being one factor influencing the hydraulic resistance). FIG. 10 is based on a water supply line 71 having an inner diameter of 4 mm.

As can be derived from FIG. 10, the pressure difference, which equals the pressure loss over the given length, increases with increasing length of the line 71 as well as increasing flow rate.

Thus, the controller 80 can control an output water pressure of the pressurization unit 61 on the basis of such relationship. As a mere example, the pressurization unit 61 can be operated (controlled by controller unit 80 to convey water) with an output pressure according to:

$$P_{pump} = P_{loss} + P_{consumer}$$

wherein $P_{pump}$ is the output pressure of the pressurization unit 60, $P_{loss}$ is the pressure loss in the pipe 70 depending on the hydraulic resistance (e.g., length, etc.) of the pipe 70 (as well as depending on the required flow rate at the water consumer), and $P_{consumer}$ is the required water pressure at the water consumer of the respective subset 101, 102, 103.

By providing one pressurization unit 60 for each subset 101, 102, 103 of water consumers, an optimized water pressure as well as optimized flow rate of water can be provided at each water consumer 100.

In order to allow the controller 80 to control each pressurization unit 60 to provide the optimized water pressure, the controller 80 can be informed about the water consumer 100 activated and requiring water supply from the respective pressurization unit 60. This can be achieved by a consumer controller 180 configured to transmit a signal indicating a water need or demand of one or more associated water consumers 100. For instance, each water consumer 100 may be equipped with a respective individual consumer controller 180, such as an electric or electronic activator for a water supply through the water consumer 100. Alternatively or additionally, a consumer controller 180 may be installed for controlling a plurality of water consumers 100, such as one or more or all water consumers 100 of a subset 101, 102, 103.

As a mere example, the consumer controller 180 may comprise or be connected to a pushbutton, a contactless sensor or the like, which a user can employ to receive or use water. The consumer controller 180 can then generate a signal indicating this water usage activation and transmit the signal to the controller 80. For example, the consumer controller 180 can be electrically or electronically connected to the controller, such as in a wired or wireless fashion. Alternatively or additionally, the consumer controller can be connected to an aircraft data network 82, which is a prerequisite for the majority of aircrafts. Likewise, the controller 80 can be connected to such aircraft network 82 and can receive the signal from one or more consumer controllers 180.

Figure 2:
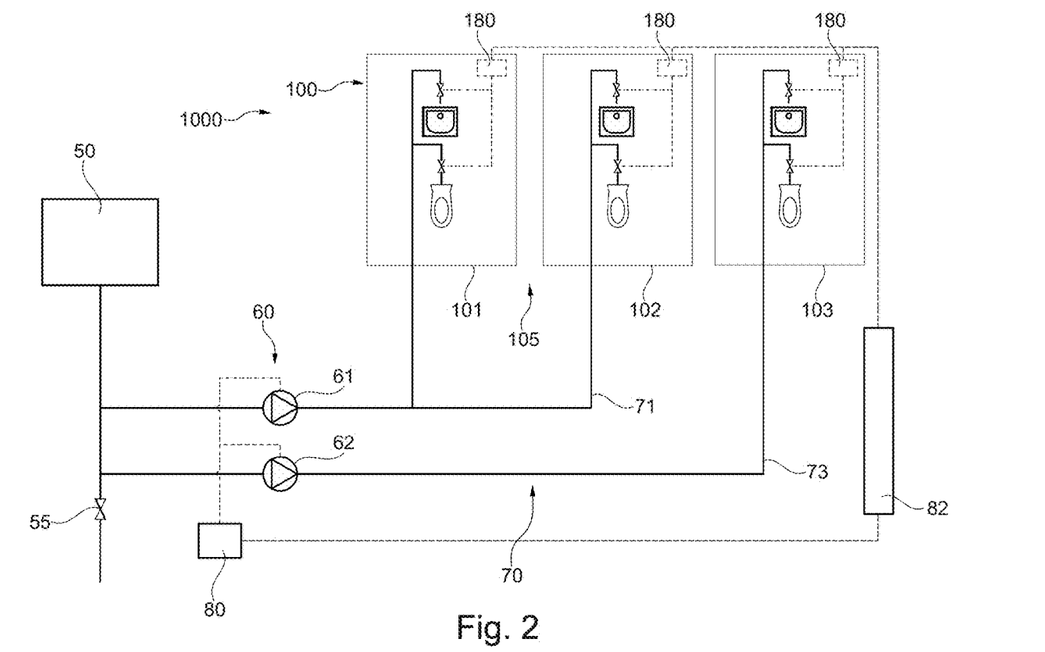
FIG. 2 schematically illustrates another example water supply system.

FIG. 2 schematically illustrates another example water supply system 1000, which comprises components similar or identical to those of the water supply system 1000 of FIG. 1. These similar or identical features are provided with the same reference numerals and their description will be omitted for sake of brevity.

The difference between the water supply systems of FIGS. 1 and 2 is that the system of FIG. 2 comprises only two pressurization units 61, 62 and corresponding water supply lines 71, 73. In the system of FIG. 2, a plurality of water consumers are grouped together and form a subset 105. In the illustrated example, the water consumers of two monuments 101, 102 are grouped together as a subset 105 and receive water from the same pressurization unit 61. For example, the water consumers 100 of the subset 105 may require a water supply line of substantially the same length, i.e. having a substantially similar hydraulic resistance. Thus, the pressurization unit 61 can be operated with the same parameters and/or characteristics, i.e. can be operated to output the same water pressure, for each water consumer 100 in the subset 105. Furthermore, in case more than one water consumer 100 of the subset 105 is activated at the same time, the pressurization unit 61 can be controlled (e.g., by controller 80) to supply an output pressure sufficient for all active water consumers 100.

Although FIG. 2 illustrates one consumer controller 180 for each monument 101, 102, it is to be understood that a single consumer controller 180 can be employed for all water consumers 100 of this subset 105.

Figure 3:
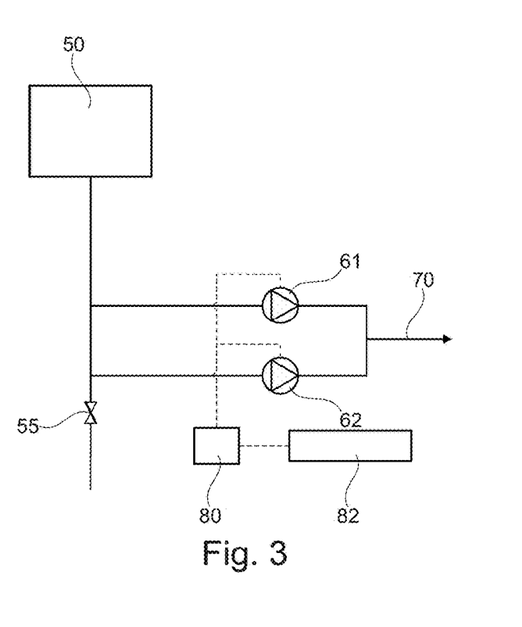
FIGS. 3 to 5 schematically illustrate examples of an arrangement of pressurization units.
Figure 4:
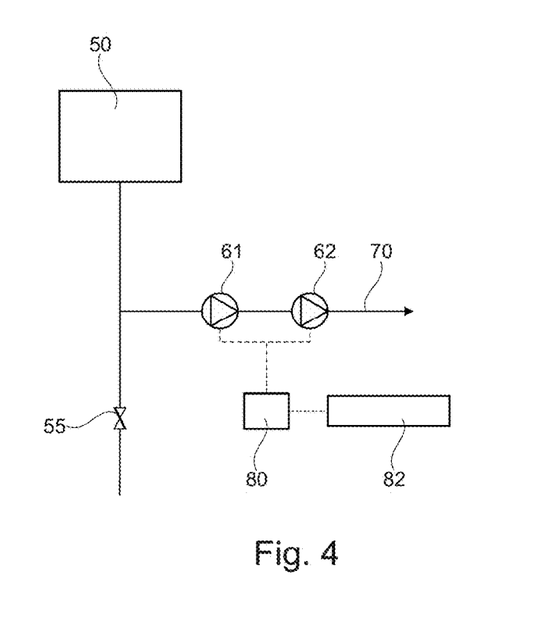
Figure 5:
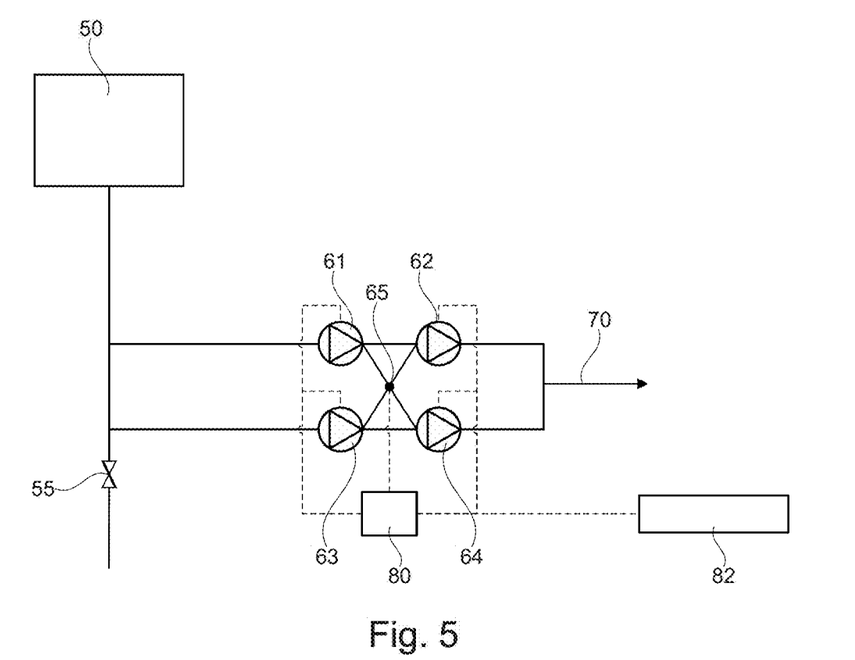

FIGS. 3 to 5 schematically illustrate examples of an arrangement of pressurization units 60. Specifically, while one or more water consumers 100 can be supplied with water from a single pressurization unit, the water supply system 1000 can further comprise another pressurization unit 62 that conveys water to the first subset 101, 102, 103, 105. In other words, a plurality of pressurization units 61, 62 can be employed to convey water to the same water supply line 70.

In FIG. 3, two pressurization units 61, 62 are arranged parallel to one another, in order to achieve a higher flow rate with substantially the same output pressure. In FIG. 4, two pressurization units 61, 62 are arranged in series, in order to achieve a higher output pressure. In case of FIG. 4, the pressurization units 61, 62 can be fluidly connected directly to one another or with only a short duct or pipe there between. Alternatively, the downstream pressurization unit 62 can be arranged further away from the first pressurization unit 61, such as after 25%, 50% or 75% of the entire length of the high-pressure water supply line 70, in order for the second pressurization unit 62 to function as a booster pump.

FIG. 5 illustrates a further example, which involves four pressurization units 61, 62, 63, 64. The pressurization units of this example are arranged, so that they can be connected to one another pairwise in parallel or in series, and optionally with another pressurization unit that can be connected in parallel or series. As a mere example, a cross feed valve 65 or multiway valve in a connecting line between the pressurization units 60 can be employed to convey water from pressurization units 61 and 63 to pressurization unit 62 and/or 64, which allows controlling the output pressure of all pressurization units 60 into water supply line 70. Thus, any desired water pressure can be achieved by operating one or more pressurization units 61, 62, 63, 64 at one or more restrictive parameters or characteristics.

Figure 6:
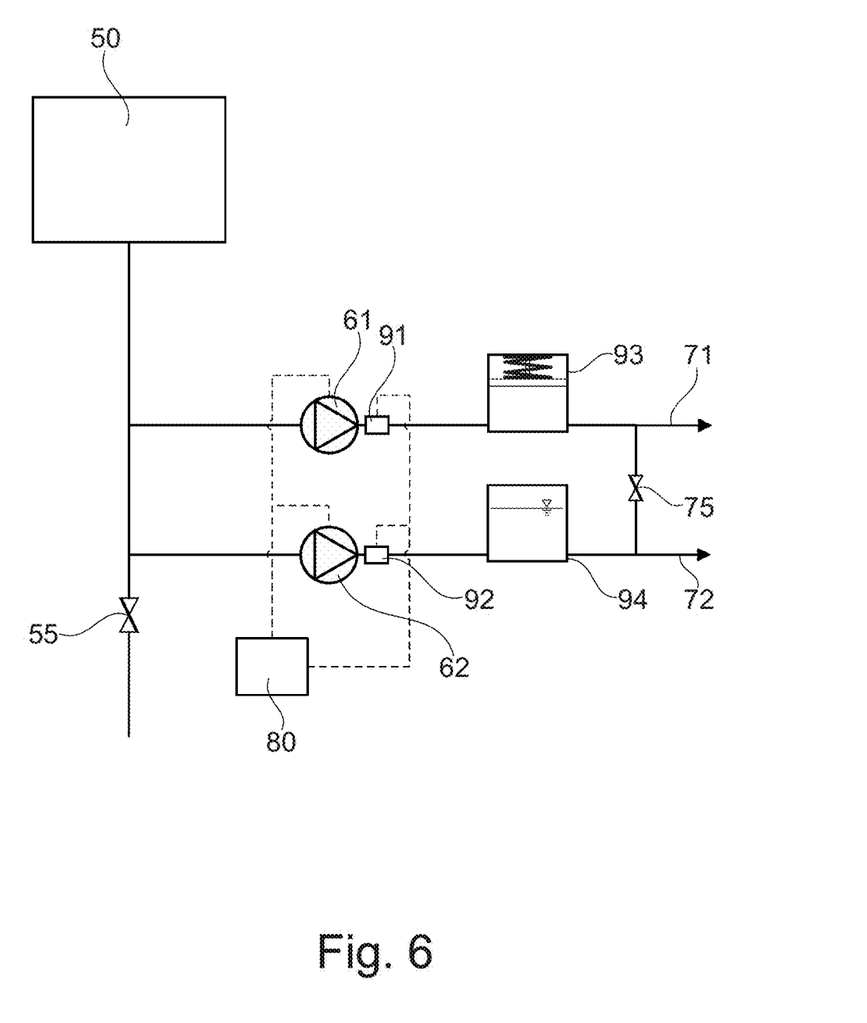
FIG. 6 schematically illustrates details of a further example water supply system.

FIG. 6 schematically illustrates details of a further example water supply system 1000. This water supply system 1000 further comprises a pressure sensor 91, 92 (or pressure switch) in the high pressure water supply line 71, 72, respectively. For example, the pressure sensor 91, 92 can be installed close to a downstream output of the pressurization unit 61, 62. For example, the controller 80 can then be further configured to maintain an output pressure of the pressurization unit 61, 62 at a predefined pressure level. The pressure sensor 91, 92 can be connected to the controller 80, so that the controller 80 receives a signal from the respective pressure sensor 91, 92. This allows omitting a consumer controller 180, as the controller 80 can solely operate on the basis of the signals from the pressure sensors 91, 92. As a mere example, in case of a pressure drop in high pressure water supply line 71, 72 (measured by the respective pressure sensor 91, 92) the controller 80 can control the respective pressurization unit 61, 62 to uphold/maintain the output pressure.

A further example measure can be in form of a pressure equalizing reservoir 93, 94 (or pressure maintaining reservoir) fluidly connected to the high pressure water supply line 71, 72 and configured to mechanically maintain a predefined pressure level in the high pressure water supply line 71, 72. This pressure equalizing reservoir 93, 94 can be a simple reservoir having a gas, such as air or nitrogen, therein that is compressed if water enters the reservoir. Alternatively or additionally, the reservoir 93, 94 can include an elastic or biased element, such as a membrane or a spring-loaded piston. FIG. 6 illustrates reservoir 93 with a spring-loaded piston, while reservoir 94 only includes gas or a membrane. For instance, if a specific pressure is applied to the water in the water supply line 71, 72, this pressure may be maintained, if the water consumer stops water consumption. If the water consumer resumes water consumption, the pressure in the water supply line 71, 72 would drop, if no reservoir 93, 94 would be installed. Until the pressurization unit 61, 62 can start again or can increase the output water pressure, the pressure in the water supply line 71, 72 is mechanically uphold or maintained by expanding the gas, membrane and/or spring-loaded piston in the reservoir 93, 94.

The pressure sensor 91, 92 or pressure switch illustrated directly downstream of the corresponding pressurization units 61, 62 can alternatively be arranged at or in the pressure equalizing reservoir 93, 94.

Furthermore, FIG. 6 illustrates another optional feature of any of the water supply systems 1000. For instance, a cross feed valve 75 can be installed between the water supply lines 71, 72. This allows still using all water consumers 100 at water supply lines 71, 72, in case one of the pressurization units 61, 62 fails. Likewise, a parallel connection of pressurization units 61, 62 is possible by opening valve 75.

Figure 7:
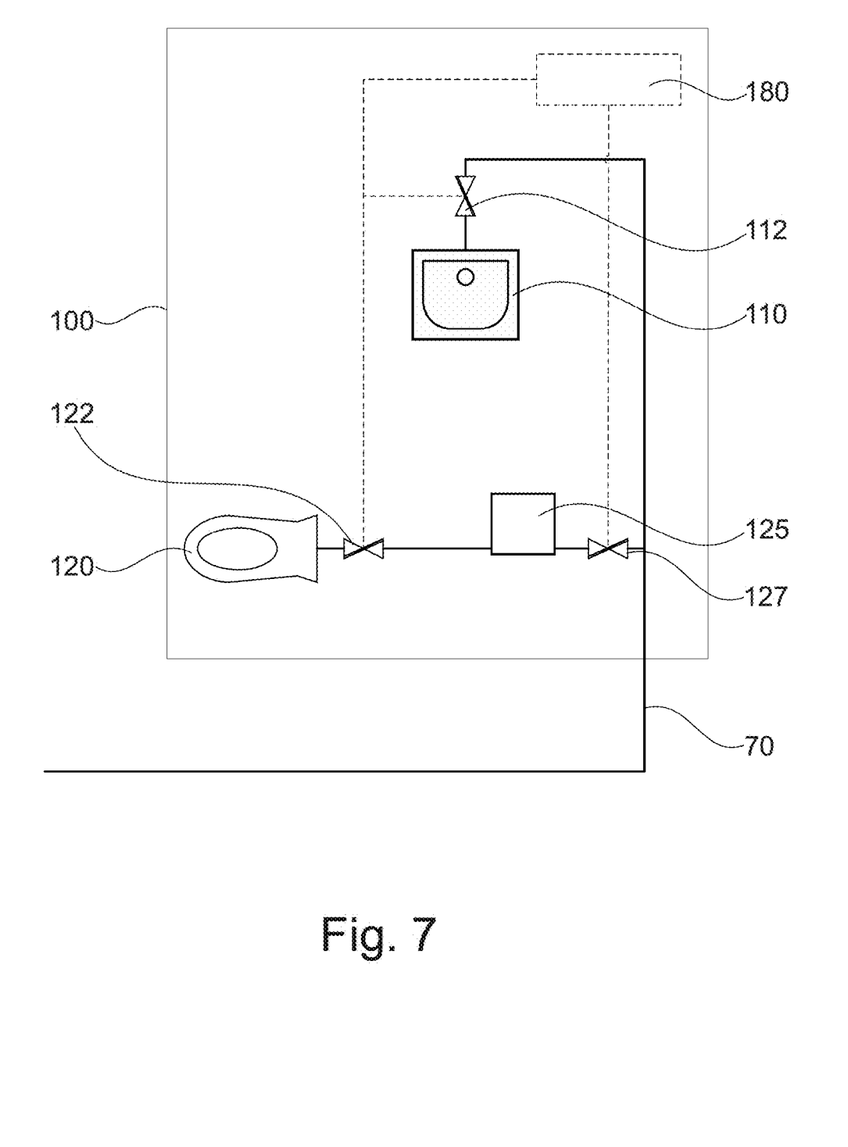
FIG. 7 schematically illustrates details of an example water consumer.

FIG. 7 schematically illustrates details of an example water consumer 100, which in this specific example comprises a faucet 110 and a toilet 120. The faucet 110 and the toilet 120 may likewise be referred to as water consumers 100. Since they are grouped together in this monument 100, they can also be viewed as a subset 101, 102, 103 of water consumers 100.

In any case, the faucet 110 (with or without a water heater (not illustrated)) is connected to the water supply line 70 via a valve 112, and the toilet 120 is also connected to the water supply line 70 via a valve 127. Since a faucet 110 and a toilet 120 require different flow rates of water and, particularly, a different pressure (the toilet 120 requires a higher pressure for a shorter time period), the associated pressurization unit 60 has to be operated with a corresponding, respective output pressure depending on whether the faucet 110 and/or the toilet 120 is activated.

If such operation of the pressurization unit 60 is not desired, the pressurization unit 60 may be configured to operate at an output pressure suitable for the faucet 110. In order to correctly flush the toilet, a micro storage device 125 is installed and fluidly connected to the high pressure water supply line 70. The micro storage device 125 is configured to store an amount of water required for flushing a toilet 120, and to achieve a water pressure sufficient for a nozzle rinsing the toilet 120. For example, by opening valve 127, water from the water supply line 70 can be filled into the micro storage device 125, where it can build up a particular pressure. Then valve 127 is closed. When the toilet 120 is flushed, valve 122 is opened, and the built-up pressure in micro storage device 125 releases the water through a nozzle (not explicitly illustrated) flushing the toilet 120.

As a mere example, the micro storage device 125 may be equipped with a biasing element, such as the reservoir 93, 94, in order to facilitate a fast release of the water from the micro storage device 125 under the required pressure.

Figure 8:
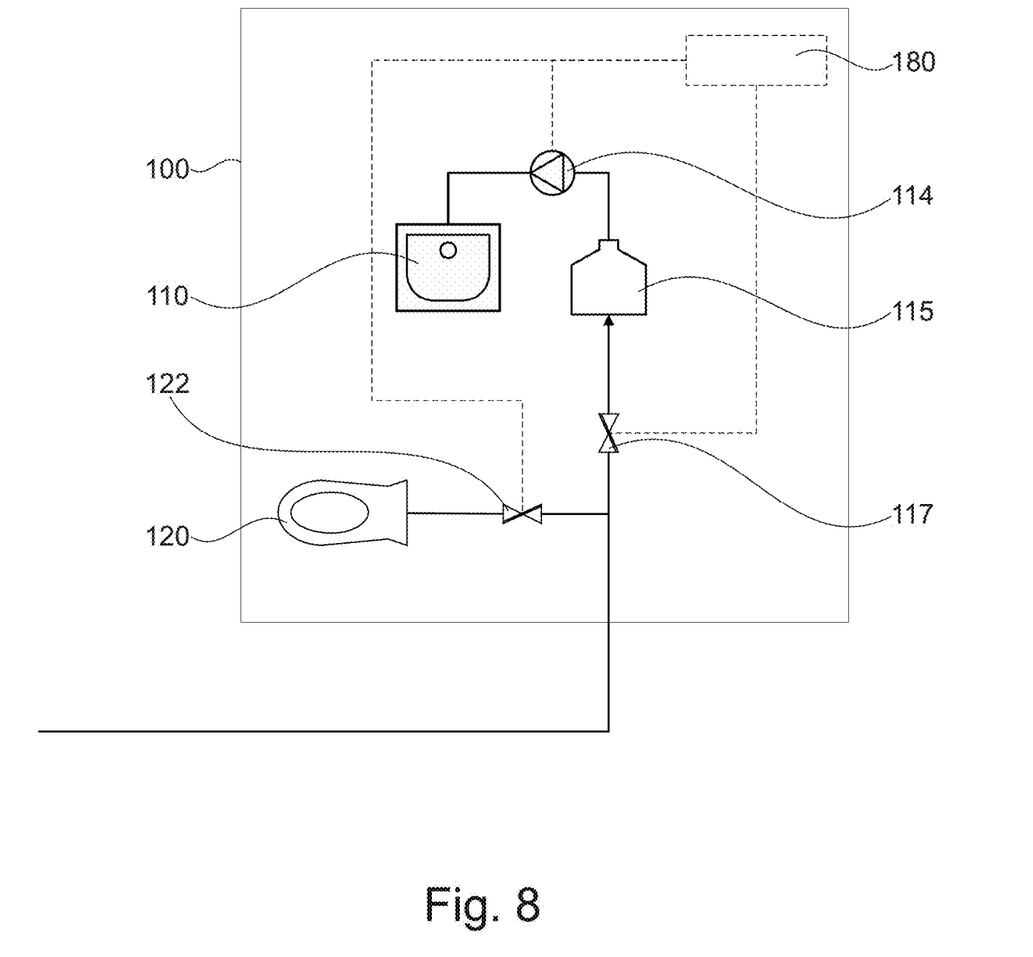
FIG. 8 schematically illustrates details of another example water consumer.

FIG. 8 schematically illustrates details of another example water consumer 100. In this case, the water consumer 100 is also a lavatory monument comprising a faucet 110 and a toilet 120. In this case, the toilet 120 is solely connected to the water supply line 70 via a corresponding valve 122. Thus, the output pressure of the associated pressurization unit 60 may be controlled in such a manner that flushing the toilet can easily be achieved.

However, such pressure may be too high for the water outlet at the faucet 110 or a water heater (not illustrated) implemented together with the faucet 110. Thus, the example lavatory monument 100 includes a water buffer tank 115 and a water conveying device 114 configured to convey water from the water buffer tank 115 to the faucet 110. The water buffer tank 115 can be an unpressurized tank, which is only filled via valve 117 from the high-pressure water supply line 70. Thus, the faucet can be used anytime, irrespective of whether water is supplied via water supply line 70. As a mere example, the water buffer tank 115 can be (re-) filled timely independent from its usage. In addition, the water buffer tank 115 may further be equipped with a water heater (not explicitly illustrated).

In any of the examples illustrated in and explained with respect to FIGS. 7 and 8, a consumer controller 180 can be configured to control a valve 112, 117, 122, 127 to operate the respective water consumer (faucet 110 or toilet 120) and/or fill the micro storage device 125 and/or water buffer tank 115. Alternatively, the valves 112, 117, 122, 127 can provide the consumer controller 180 with information about their respective state, such as opened or closed. In addition, the consumer controller 180 may be connected to the water conveying device 114, in order to operate the same or receive a signal therefrom about the state of the water conveying device 114. Furthermore, also optionally the micro storage device 125 and/or water buffer tank 115 can include a respective water level measuring device indicating a water level in the micro storage device 125 or water buffer tank 115. As a mere example, the consumer controller 180 may comprise or be connected to such water level measuring device, for example, in order to control one or more of the valves 117, 127.

In any case, the consumer controller 180 can be configured to generate and transmit a signal to the controller 80, which signal indicates a water consumption, the state of a valve 112, 117, 122, 127, a water level in the micro storage device 125, a water level in the water buffer tank 115 or other information about the water consumers 100.

FIG. 9 schematically illustrates an aircraft 1 comprising a water supply system 1000. For instance, portions of the water supply system 1000 can be arranged in a bottom region of the aircraft 1, such as a cargo deck below floor 5.

Particularly, the main water tank 50 and the pressurization units 60 can be installed in the lower deck. As illustrated, the main water tank 50 can be filled via an inlet 57 and a fill valve 55. A controller 80 can be arranged close to the pressurization units 60, such as in the lower deck of the aircraft 1.

The water consumers 100 are mainly arranged in an upper deck, i.e. above the floor 5. However, water consumers 100 can likewise be installed in a lower deck, such as a lower deck toilet reachable through a staircase.

In case the water consumers 100, particularly the associated monument(s), are located (directly) above the main water tank 50, a substantially or mainly vertical pipe routing can be applied between the main water tank 50 and the associated monument(s). The high-pressure water supply line(s) 70 could then be provided with a larger inner diameter, i.e. greater than 4 mm or greater than 6 mm. This would allow draining the water supply line(s) 70 by gravity.

An aircraft network 82 may be installed anywhere in the aircraft, and particularly runs through the aircraft in a longitudinal direction. Thus, irrespective of a location of a water consumer 100 along the longitudinal axis of the aircraft 1, the controller 80 can be connected to the aircraft network 82, and also anywhere along the longitudinal axis of the aircraft 1.

Such high-pressure water supply system 1000 for an aircraft 1 allows a simplified water supply system with respect to arrangement of the pressurization units 60 as well as running the network of water supply lines 70. In addition, by controlling the pressurization units 60 based on a hydraulic resistance of the corresponding water supply lines and optionally other factors, different models of supplying water to water consumers 100 can be embedded.

As mere examples, the pressurization units 60 can be controlled on the basis of a type and number of water consumers 100 used at the same time, a location of the water consumer 100 in the aircraft 1 (e.g., a position of the water consumer 100 having a particular distance from the pressurization unit 60 and requiring a certain length for the water supply line 70), a passenger class (first class, business class, economy class or the like) associated with the subset of water consumers, a time of day or time of flight (daylight, night, sleeping phases, food service phases, etc.), and the like.

Furthermore, in case one or more water consumers 100 of a particular subset 101, 102, 103, 105 would still require a different water pressure arriving at the respective water consumer 100, a proportional valve or pressure reducer can be employed with this particular water consumer 100. In other words, if the hydraulic resistance of the water supply line 70 requires a certain output pressure, but the minimum pressure value arriving at the subset 101, 102, 103, 105 of water consumers 100 still being too high for a particular water consumer 100, that particular water consumer 100 may be supplied with a restricted water pressure by employing a proportional valve or pressure reducer.

Likewise, adjustable pressure restrictors (not illustrated) can be employed at such water consumers 100. Such adjustable pressure restrictors could further be connected to the controller 80, which is further configured to control a pressure restriction of the respective adjustable pressure restrictor.

It is believed that the advantages of the technique presented herein will be fully understood from the foregoing description, and it will be apparent that various changes may be made in the form, constructions and arrangement of the example aspects thereof without departing from the scope of the disclosure or without sacrificing all of its advantageous effects. Because the technique presented herein can be varied in many ways, it will be recognized that the disclosure should be limited only by the scope of the claims that follow.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A high pressure water supply system for an aircraft, the water supply system comprising: a main water supply tank; a plurality of water consumers; a plurality of pressurization units that are each connected to the main water supply tank in parallel and each of which is configured to convey water from the main water supply tank to one or more of the plurality of water consumers via a high pressure water supply line that is supplied with water by a corresponding one of the plurality of pressurization units; and a controller; wherein one pressurization unit of the plurality of pressurization units is configured to convey water to a first subset of water consumers of the plurality of water consumers; wherein the controller is configured to control an output pressure of the one pressurization unit depending on a hydraulic resistance of the high pressure water supply line that is supplied with water by the one pressurization unit; wherein a further pressurization unit is configured to convey water to the first subset of water consumers via the high pressure water supply line that is fluidly connected to the first subset of water consumers; the further pressurization unit is fluidly connected to the one pressurization unit in parallel; and the controller is configured to control the one pressurization unit and the further pressurization unit on a required flow rate of water at the first subset of water consumers.

2. The water supply system of claim 1, wherein;
each of the plurality of water consumers is supplied with high pressure water from a respective one of the plurality of pressurization units via a respective high pressure water supply line;
the first subset of water consumers comprises two or more water consumers of the plurality of water consumers; and
the water supply system comprises a second subset of water consumers of the plurality of water consumers, the second subset comprising one or more water consumers.

3. The water supply system of claim 2, wherein the controller is configured to control an output pressure of each of the plurality of pressurization units depending on a hydraulic resistance of a respective one of the high pressure water supply lines that is supplied by each such pressurization unit.

4. The water supply system of claim 1, comprising:
a pressure sensor in the high pressure water supply line;
wherein the controller is configured to maintain the output pressure of the one pressurization unit at a predefined pressure level.

5. The water supply system of claim 4, comprising a pressure equalizing reservoir fluidly connected to the high pressure water supply line and configured to mechanically maintain the predefined pressure level in the high pressure water supply line.

6. The water supply system of claim 1, wherein:
at least one of the plurality of water consumers comprises a micro storage device fluidly connected to the high pressure water supply line;
the micro storage device is configured to store an amount of water required for flushing a toilet; and
the micro storage device is configured to achieve a water pressure sufficient for a nozzle rinsing the toilet.

7. The water supply system of claim 1, wherein at least one of the plurality of water consumers comprises;
an unpressurized water buffer tank; and
a water conveying device configured to convey water from the unpressurized water buffer tank to a faucet.

8. The water supply system of claim 1, wherein:
at least one water consumer of the plurality of water consumers comprises a consumer controller configured to transmit a signal indicating a water usage at each of the at least one water consumer with which the consumer controller is associated; and
the controller is configured to receive the signal transmitted from the consumer controller and to control the output pressure of the one pressurization unit based on the received signal.

9. An aircraft comprising the water supply system of claim 1.

10. The water supply system of claim 1, wherein each of the plurality of water consumers is supplied with high pressure water from a respective one of the plurality of pressurization units via a respective high pressure water supply line.

11. The water supply system of claim 1, wherein the first subset of water consumers comprises two or more water consumers of the plurality of water consumers.

12. The water supply system of claim 1, wherein the water supply system comprises a second subset of water consumers of the plurality of water consumers, the second subset comprising one or more water consumers.

13. The water supply system of claim 1, wherein:
each of the plurality of water consumers is supplied with high pressure water from a respective one of the plurality of pressurization units via a respective high pressure water supply line; and
the first subset of water consumers comprises two or more water consumers of the plurality of water consumers.

14. The water supply system of claim 1, wherein:
the first subset of water consumers comprises two or more water consumers of the plurality of water consumers; and
the water supply system comprises a second subset of water consumers of the plurality of water consumers, the second subset comprising one or more water consumers.

15. The water supply system of claim 1, wherein:
each of the plurality of water consumers is supplied with high pressure water from a respective one of the plurality of pressurization units via a respective high pressure water supply line; and
the water supply system comprises a second subset of water consumers of the plurality of water consumers, the second subset comprising one or more water consumers.

* * * * *